`US 008571954B2`

(12) United States Patent
Leary et al.

(10) Patent No.: US 8,571,954 B2
(45) Date of Patent: Oct. 29, 2013

(54) CUSTOMER EXPOSURE VIEW AND INCOME STATEMENTS (CEVIS)

(75) Inventors: Michael J. Leary, North Wales, PA (US); Brian David King, Hockessin, DE (US); Jeffrey Roger Walls, Charlotte, NC (US); Keith Carlascio, Fleming Island, FL (US); Scott D'Allaird, Mint Hill, NC (US); William Anthony Nobili, Charlotte, NC (US); Diana L. Imrie, Belmont, NC (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 12/885,905

(22) Filed: Sep. 20, 2010

(65) Prior Publication Data
US 2012/0072324 A1     Mar. 22, 2012

(51) Int. Cl.
*G06Q 40/00*     (2012.01)

(52) U.S. Cl.
USPC .............................................. 705/35; 705/1.1

(58) Field of Classification Search
USPC ........................................................ 705/1.1
See application file for complete search history.

(56) References Cited

U.S. PATENT DOCUMENTS

| | | | |
|---|---|---|---|
| 5,930,764 A | 7/1999 | Melchione et al. | |
| 7,266,508 B1 | 9/2007 | Owen et al. | |
| 7,734,539 B2 | 6/2010 | Ghosh et al. | |
| 8,300,525 B1 * | 10/2012 | Kohn et al. | 370/230 |
| 2003/0212654 A1 | 11/2003 | Harper et al. | |
| 2004/0059786 A1 | 3/2004 | Caughey | |
| 2004/0098274 A1 | 5/2004 | Dezonno et al. | |
| 2004/0109557 A1 | 6/2004 | Lenard | |
| 2004/0138995 A1 * | 7/2004 | Hershkowitz et al. | 705/38 |
| 2006/0085259 A1 | 4/2006 | Nicholas et al. | |
| 2007/0124161 A1 | 5/2007 | Mueller et al. | |
| 2008/0010248 A1 | 1/2008 | Vautier | |
| 2008/0183515 A1 * | 7/2008 | Chheda et al. | 705/7 |
| 2009/0012895 A1 | 1/2009 | Mehrabi | |
| 2009/0037323 A1 | 2/2009 | Feinstein et al. | |
| 2009/0144201 A1 * | 6/2009 | Gierkink et al. | 705/64 |
| 2010/0005027 A1 | 1/2010 | Maloche et al. | |
| 2010/0088168 A1 | 4/2010 | Sullivan et al. | |
| 2010/0125547 A1 * | 5/2010 | Barrett et al. | 707/607 |
| 2010/0145771 A1 | 6/2010 | Fligler et al. | |
| 2010/0239085 A1 | 9/2010 | Sampson et al. | |

OTHER PUBLICATIONS

U.S. Appl. No. 13/039,036, to inventors Dennis Wayne Carwile, Jr., et al. "Centralized Customer Contact Database ", 31 page specification and drawings, filed Mar. 2, 2011.
D. W. Carwile, Jr. et al., U.S. Appl. No. 13/039,036, Non-final Office Action dated Sep. 17, 2012.
D. W. Carwile, Jr. et al., U.S. Appl. No. 13/039,036, Final Office Action dated Jan. 7, 2013.

* cited by examiner

*Primary Examiner* — William Rankins
(74) *Attorney, Agent, or Firm* — Michael A. Springs

(57) ABSTRACT

According to one embodiment of the present invention, a method comprises receiving a request to aggregate data associated with a customer. The method determines a first identifier associated with the customer that identifies the customer and a second identifier that identifies a household associated with the customer. Data associated with the second identifier is aggregated and communicated in response to the request.

15 Claims, 3 Drawing Sheets

Exposure Data 164

Shared Risk Actions 200

| Party | Account Number | Action Date | Product Type | Reason Type | Action Type | App Source System |
|---|---|---|---|---|---|---|
| ABC Customer | XYZ | 01/09/2009 | US Card | Undefined Reason Code | Line Decrease | US Card |

Cross-Product Delinquency Summary 202

| Party | 1 Mnth Dlnq Bl | 2 Mnths Dlnq Bl | 3+ Mnths Dlnq Bl | Open Line Amt | Non Dlnq Bl | Non Dlnq Line Amt | Chgoff 12 Mth Bl | Chgoff 12 Mth Ct | Ercts 12 Mth Ct | Repos 12 Mth Ct | Sttmnts 12 Mth Ct |
|---|---|---|---|---|---|---|---|---|---|---|---|
| Customer | $0 | $0 | $403,740 | $13,000 | $84,211 | $13,000 | | | 1 | 0 | 0 |
| Household Member | $0 | $0 | $0 | $20,700 | $22,641 | $20,700 | | | 0 | 0 | 0 |

Legal Information 204

| Party | Legal Status Class | Legal Status Code | Legal Status Description | Bankruptcy Notification Data |
|---|---|---|---|---|
| Customer | CC | CC | CONSUMER CREDIT COUNSELLING SERVICES | |

CRS On-Us Income Statement for Party Collection : ABC

| Party Name | Income Expense Level 1 | Source | |
|---|---|---|---|
| ▼ Incoming | | | |
| Household Member (206) | Transfer in | BANK | $3,360 |
| | Cash Transfer Total | | $3,360 |
| | Other | BANK | $1,050 |
| | Other Income Total | BANK | $1,050 |
| Incoming Total | | | $4,410 |
| ▼ Outgoing | | | |
| Household Member (208) | Entertainment | | $1,269 |
| | Other | | -$629 |
| | Retail | | -$3,239 |
| | Services | | -$368 |
| | Utilities | | -$53 |
| | Transfer Out | | -$260 |
| | Expense Total | | -$5,818 |
| Customer | | | -$1,086 |
| | Expense Total | | -$1,086 |
| Outgoing Total | | | -$6,904 |
| Net (210) | | | -$2,494 |

166 Cash Flow Data

CUSTOMER EXPOSURE VIEW AND INCOME STATEMENTS (CEVIS)

TECHNICAL FIELD OF THE INVENTION

The present invention relates generally to financial services and more specifically to providing a customer exposure view and income statements.

BACKGROUND OF THE INVENTION

Before embarking on a business transaction, such as extending a line of credit to a customer, financial institutions perform due diligence analysis to determine potential risks associated with the business transaction. Currently, the information gathered to accomplish the due diligence is limited to high-level information regarding the customer.

SUMMARY OF THE INVENTION

In accordance with the present invention, disadvantages and problems associated with aggregating customer transaction data for due diligence to facilitate business transactions may be reduced or eliminated.

According to one embodiment of the present invention, a method comprises receiving a request to aggregate data associated with a customer. The method determines a first identifier associated with the customer that identifies the customer and a second identifier that identifies a household associated with the customer. Data associated with the second identifier is aggregated and communicated in response to the request.

Certain embodiments of the invention may provide one or more technical advantages. A technical advantage of one embodiment includes aggregating data that includes exposure data and cash flow data associated with a customer to facilitate a business transaction with the customer. Another technical advantage of an embodiment provides aggregating data associated with the customer's household. Another technical advantage of an embodiment includes aggregating data across multiple products or lines of business. Using aggregated data provides accurate insights to better determine the potential risks associated with the proposed business transaction. Additionally, using aggregated data facilitates customer retention by tailoring products to the needs of a particular customer.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 illustrates an example of a database that stores exposure data and cash flow data.

DETAILED DESCRIPTION OF THE INVENTION

Figure 1:
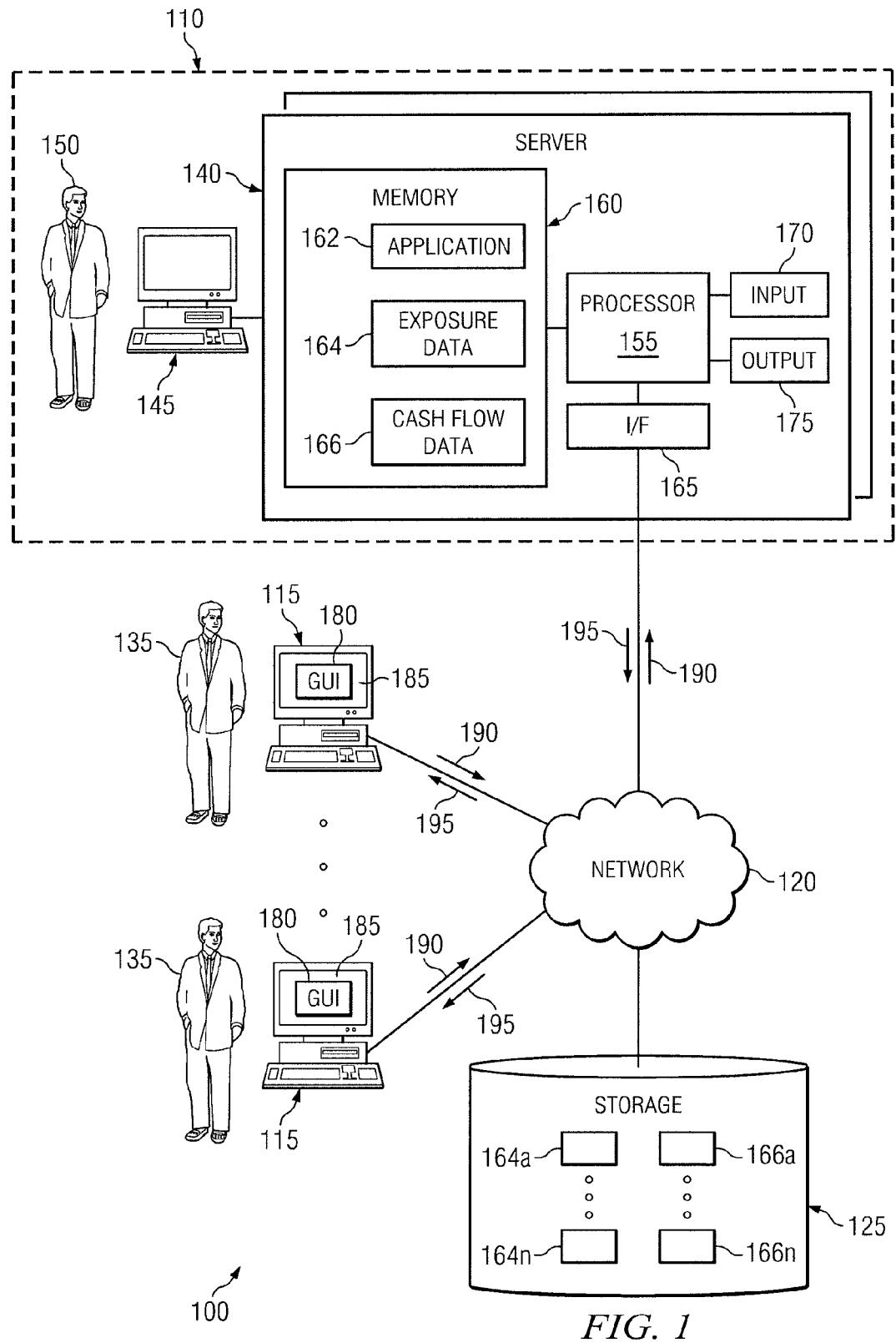
FIG. 1 illustrates an example of a system that aggregates data to facilitate business transactions.
Figure 3:
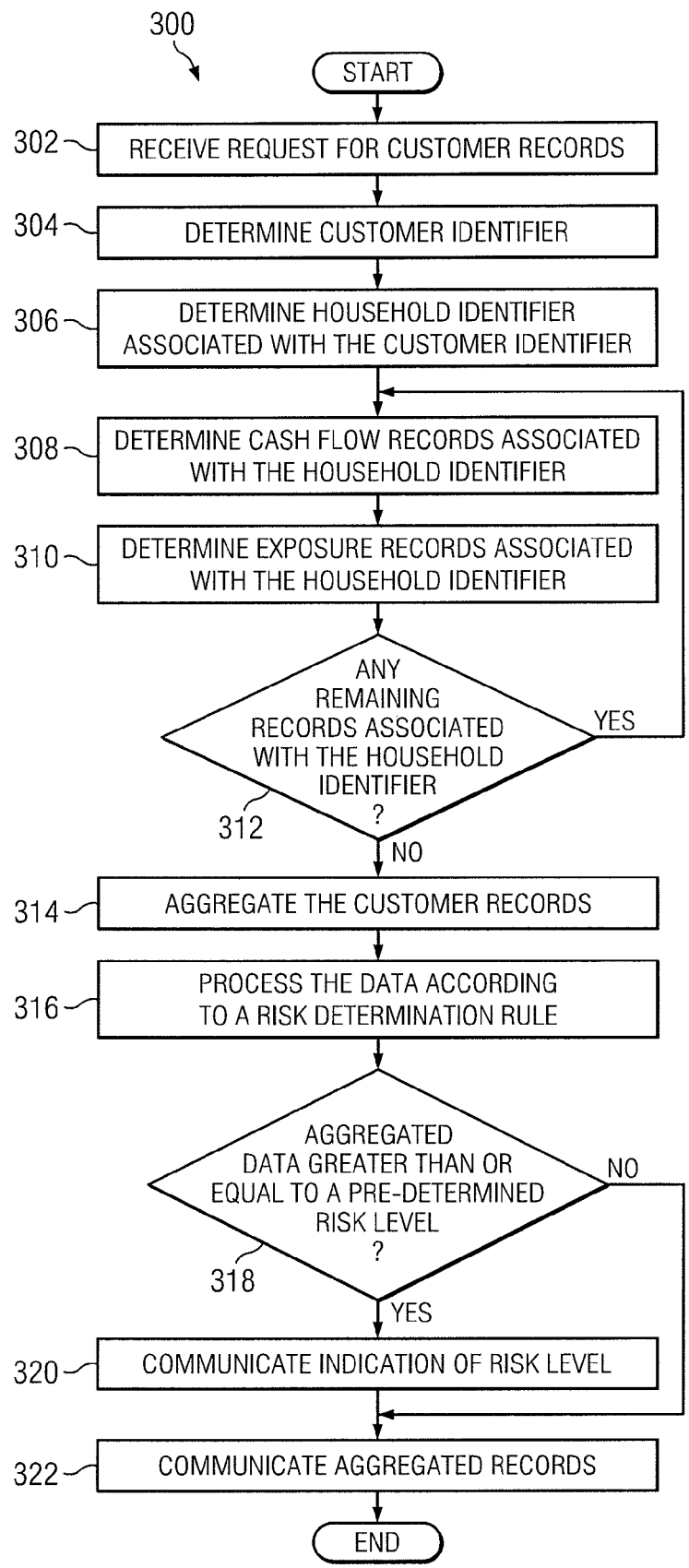
FIG. 3 illustrates a flowchart for aggregating data associated with a customer.

Embodiments of the present invention and its advantages are best understood by referring to FIGS. 1 through 3 of the drawings, like numerals being used for like and corresponding parts of the various drawings.

Banks and other financial institutions embarking on business transactions with customers may perform due diligence to determine the potential risks associated with the transaction. Examples of transactions include, but are not limited to, extending lines of credit (e.g., credit cards), underwriting insurance, and providing mortgages, home equity loans, or other loans. Transactions may include consumer transactions and small business transactions. Typically, the information gathered to accomplish due diligence may be limited to high-level information. The teachings of the disclosure recognize that it would be desirable to provide detailed information to allow the financial institution to better determine the potential risks associated with the proposed transaction. FIGS. 1 through 3 below illustrate a system and method of aggregating data to provide exposure data and cash flow data to the financial institution.

FIG. 1 illustrates a system 100 according to certain embodiments. System 100 may include an enterprise 110, one or more clients 115, a network storage device 125, one or more servers 140, and one or more users 135. Enterprise 110, clients 115, and network storage device 125 may be communicatively coupled by a network 120. Enterprise 110 is generally operable to provide aggregated data 195, as described below.

In general, one or more servers 140 may provide aggregated data 195 to users 135. User 135 may first provide a request 190 to server 140 by utilizing client 115. Server 140 may then select the data associated with an identifier indicated by request 190 provided by user 135. Server 140 may then aggregate the selected data and return aggregated data 195 to user 135.

Client 115 may refer to any device that enables user 135 to interact with server 140. In some embodiments, client 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Client 115 may also comprise any suitable user interface such as a display 185, microphone, keyboard, or any other appropriate terminal equipment usable by a user 135. It will be understood that system 100 may comprise any number and combination of clients 115. User 135 utilizes client 115 to interact with server 140 to receive aggregated data 195, as described below. In some embodiments, user 135 may be an financial institution employee performing due diligence for a transaction with a customer.

In some embodiments, client 115 may include a graphical user interface (GUI) 180. GUI 180 is generally operable to tailor and filter data entered by and presented to user 135. GUI 180 may provide user 135 with an efficient and user-friendly presentation of request 190 and/or aggregated data 195. GUI 180 may comprise a plurality of displays having interactive fields, pull-down lists, and buttons operated by user 135. GUI 180 may include multiple levels of abstraction including groupings and boundaries. It should be understood that the term GUI 180 may be used in the singular or in the plural to describe one or more GUIs 180 and each of the displays of a particular GUI 180.

In some embodiments, network storage device 125 may refer to any suitable device communicatively coupled to network 120 and capable of storing and facilitating retrieval of data and/or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network storage device 125 may store any data and/or instructions utilized by server 140. In the illustrated embodiment, network storage device 125 stores exposure data 164a to 164n and cash flow data 166a to 166n. Exposure data 164 may include data describing events associated with a customer that may indicate a financial institution's increased exposure to a loss. Examples of exposure events may include a decrease in a line of credit, an overdraft, a failure to make a payment, a foreclosure, a bankruptcy, or other event. Cash flow data 166 may include any data describing money deposited into an account, money withdrawn from the account, and the net value of the account for a particular time period. Example embodiments of exposure data 164 and cash flow data 166 are described in FIG. 2 below.

In certain embodiments, network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, enterprise 110 may refer to a financial institution such as a bank and may include one or more servers 140, an administrator workstation 145, and an administrator 150. In some embodiments, server 140 may refer to any suitable combination of hardware and/or software implemented in one or more modules to process data and provide the described functions and operations. In some embodiments, the functions and operations described herein may be performed by a pool of servers 140. In some embodiments, server 140 may include, for example, a mainframe, server, host computer, workstation, web server, file server, a personal computer such as a laptop, or any other suitable device operable to process data. In some embodiments, server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, server 140 aggregates data 195 and provides the aggregated data 195 to users 135. In some embodiments, servers 140 may include a processor 155, server memory 160, an interface 165, an input 170, and an output 175. Server memory 160 may refer to any suitable device capable of storing and facilitating retrieval of data and/or instructions. Examples of server memory 160 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates server memory 160 as internal to server 140, it should be understood that server memory 160 may be internal or external to server 140, depending on particular implementations. Also, server memory 160 may be separate from or integral to other memory devices to achieve any suitable arrangement of memory devices for use in system 100.

Server memory 160 is generally operable to store an application 162, exposure data 164, and cash flow data 166. Application 162 generally refers to logic, rules, algorithms, code, tables, and/or other suitable instructions for performing the described functions and operations. In some embodiments, application 162 facilitates aggregation of data 195 and offers aggregated data 195 to users 135.

Server memory 160 communicatively couples to processor 155. Processor 155 is generally operable to execute application 162 stored in server memory 160 to provide aggregated data 195 according to the disclosure. Processor 155 may comprise any suitable combination of hardware and software implemented in one or more modules to execute instructions and manipulate data to perform the described functions for servers 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for server 140, send output from server 140, perform suitable processing of the input or output or both, communicate to other devices, or any combination of the preceding. Communication interface 165 may include appropriate hardware (e.g. modem, network interface card, etc.) and software, including protocol conversion and data processing capabilities, to communicate through network 120 or other communication system that allows server 140 to communicate to other devices. Communication interface 165 may include any suitable software operable to access data from various devices such as clients 115 and/or network storage device 125. Communication interface 165 may also include any suitable software operable to transmit data to various devices such as clients 115 and/or network storage device 125. Communication interface 165 may include one or more ports, conversion software, or both. In general, communication interface 165 receives request 190 from clients 115 and transmits aggregated data 195 to clients 115.

In some embodiments, input device 170 may refer to any suitable device operable to input, select, and/or manipulate various data and information. Input device 170 may include, for example, a keyboard, mouse, graphics tablet, joystick, light pen, microphone, scanner, or other suitable input device. Output device 175 may refer to any suitable device operable for displaying information to a user. Output device 175 may include, for example, a video display, a printer, a plotter, or other suitable output device.

In general, administrator 150 may interact with server 140 using an administrator workstation 145. In some embodiments, administrator workstation 145 may be communicatively coupled to server 140 and may refer to any suitable computing system, workstation, personal computer such as a laptop, or any other device operable to process data. In certain embodiments, an administrator 150 may utilize administrator workstation 145 to manage server 140 and any of the data stored in server memory 160 and/or network storage device 125.

In operation, application 162, upon execution by processor 155, facilitates aggregation of data 195 and offers aggregated data 195 to users 135. Aggregated data 195 refers to data selected to provide a comprehensive view of a customer's financial status and may include exposure data 164 and cash flow data 166. In some embodiments, aggregated data 195 may be aggregated from multiple lines of business to provide a cross-product view. As an example, aggregated data 195 may include data from home mortgage, car loan, credit card, and/or other lines of business. The lines of business may be associated with the same enterprise, such as a particular financial institution, or with multiple enterprises, such as other financial institutions or data bureaus. Additionally, aggregated data 195 may include data for the customer's personal accounts, business accounts, or both. In some embodiments, aggregated data 195 may include data associated with members of the customer's household, such as the customer's spouse, children, and/or parents.

To provide aggregated data 195, application 162 may first receive request 190 from users 135 via clients 115. In some embodiments, GUI 180 may provide locations for user 135 to enter request 190 and/or to select pre-filled options for request 190. Request 190 may include an identifier associated with the customer.

Once application 162 receives request 190, application 162 may determine an identifier associated with the customer that identifies the customer. For example, request 190 may include a customer identifier, such as a social security number or a bank account number of the customer. In some embodiments, application 162 may aggregate data associated with the customer identifier itself. Alternatively, application 162 may determine a party identifier based on the customer identifier and may aggregate data associated with the party identifier. The party identifier may comprise an identifier assigned by the financial institution to identify the accounts that are to be included when aggregating data. For example, the party identifier may be used to identify all of the accounts associated with the customer. Once the data has been aggregated, application 162 may communicate aggregated data 195 in response to request 190.

In some embodiments, application 162 may use the identifier associated with the customer to determine a second identifier that identifies a household associated with the customer. Application 162 may aggregate data associated with the second identifier. For example, application 162 may aggregate exposure data 164 associated with the household, such as exposure data indicating whether a bankruptcy, a foreclosure, a charge off, a delinquency, or a credit counseling event is associated with the household. As another example, application 162 may aggregate cash flow data associated with the household, such as cash flow data indicating an amount of incoming money and an amount of outgoing money associated with the household during a time period. Application 162 may then communicate aggregated data 195 in response to request 190.

Application 162 communicates aggregated data 195 in any suitable format. In some embodiments, the data may be aggregated according to a plurality of aggregation levels. As an example, a customer may be associated with accounts for multiple lines of business, such as credit card and car loan accounts. Application 162 may aggregate all of the data for the credit card account in one level, all of the data for the car loan account in a second level, and the combined data for both accounts at a third level (e.g., an enterprise level view). Similarly, a household view may aggregate data for each individual member of the household and may also aggregate data for all of the members of the household combined.

When aggregating data, application 162 may decide to exclude certain data that may be considered outdated. As an example, enterprise 110 may archive certain data for an extended period of time, such as sixty months. User 135, however, may only require data from the previous twelve months, twenty-four months, or other suitable time period in order to perform due diligence for the transaction. In some embodiments, the time period may vary depending on the type of data. For example, user 135 may require twenty-four months of bankruptcy data, twenty-four months of cash flow snapshots, and twelve months of detailed cash flows. In order to accommodate user 135, application 162 may access a plurality of records associated with the identifier and, for each record, determine the type of data that it contains, compare the age of the record to a maximum age for that type of record, and exclude the data from the aggregated data if the age exceeds the maximum age.

In some embodiments, application 162 may communicate a risk indicator to user 135 if the aggregated data presents a risk. For example, application 162 may process the aggregated data according to a risk-determination rule to determine a risk level. If the risk level exceeds a pre-determined threshold, the risk indicator may be communicated. An example of a risk-determination rule may be to determine whether the customer has accrued a certain number of exposure events, such as three late payments, a certain combination of exposure events, such as a late payment combined with a decrease in a line of credit, or particular cash flow events, such as a negative cash flow or a disproportionate amount of spending on entertainment. Any suitable risk indicator may be used. For example, the data that caused the risk to be generated may be highlighted or a text description of the risk may be provided. In some embodiments, application 162 may communicate a customer score, such as a score based on a formula that includes exposure data and cash flow data as inputs, that may be used by user 135 to evaluate the risk. The score may be calculated at a line of business level, an enterprise level, and/or other suitable level.

In some embodiments, aggregated data 195 may include aggregated contact information for the customer. As an example, a customer may have opened accounts at different times, and one account may have more current contact information than another. As another example, one account may be associated with a customer's home contact information and another account may be associated with the customer's business contact information. As yet another example, an account associated with a member of the customer's household may include the contact information of a family member that can locate the customer. Thus, aggregating contact information may provide more options for reaching the customer and may facilitate bill collecting, advertising, or other communications with the customer.

Application 162 may aggregate contact information using any suitable method. For example, application 162 may determine a first set of contact information that a first line of business associates with the customer and a second set of contact information that a second line of business associates with the customer. Application 162 may aggregate the first set of contact information and the second set of contact information and communicate the aggregated contact information. In some embodiments, aggregating the first set of contact information and the second set of contact information may include removing duplicative information.

FIG. 2 illustrates an example of a database of server memory 160 that stores exposure data 164 and cash flow data 166. In some embodiments, the database stores exposure data 164 aggregated from multiple exposure data records, such as exposure data 164a to 164n of network storage device 125. Similarly, the database stores cash flow data 166 aggregated from multiple cash flow records, such as cash flow data 166a to 166n of network storage device 125. Thus, the database may store data describing a customer, individual members of the household, and/or all of the members of the household combined. Moreover, the data may describe multiple accounts, separately or in combination, across various products or lines of business. In some embodiments, the database stores the data in a format that allows the data to be presented to a user in the form of a table of rows and columns. For example, the rows may be organized according to party name, party identifier, or account number, and the columns may be organized according to descriptors describing the data. In some embodiments, the database presents a high-level view with hyperlinks to allow for drilling down into the details of a particular account or other information source.

Examples of exposure data 164 include shared risk actions 200, cross-product delinquency summaries 202, and legal status summaries 204. Shared risk actions 200 describe actions initiated to reduce risk, such as actions initiated by enterprise 110 or a line of business of enterprise 110. Examples of shared risk actions 200 include decreasing a line of credit, demanding a deposit, or closing an account. In some embodiments, the database stores descriptors describing shared risk actions 200, such as the party name, the party identifier, the action date, the product type, the reason for the action, the action taken, and/or other information.

Delinquency summaries 202 describe delinquency and/or derogatory information for the party. Examples include past due accounts, charge off events, overdrafts, foreclosures, repossessions, and settlements. In some embodiments, the database stores descriptors describing delinquency summaries 202 including, but not limited to, party name, the amount of the delinquent balance as well as the how long the amount has been past due (e.g., one month, two months, or three plus months), the non-delinquent balance, the open line amount, the non-delinquent line amount, the charge off balance for a selected time period, and/or the number of derogatory events for the selected time period, such as the number of charge off, foreclosure, repossession, and settlement events.

Legal status summaries 204 describe legal actions taken or pending. Examples of legal actions include bankruptcies, charge offs, foreclosures, credit counseling, or other legal actions. In some embodiments, the database stores descriptors describing legal status summaries 204, such as the party name, legal status class, the legal status code, the event type, the event date, and/or other information.

Although certain examples have been used to illustrate exposure data 164, any suitable data may be used. For example, in some embodiments, exposure data 164 may include a list of accounts including the status of each account, such as open or closed, and the account balances. Accounts may be sorted according to party identifier, party name, product category, product class or subcategory, or account number. Account information may include a description of the account, the date the account information was last updated, the line amount, the available amount of the line, the number of days the account has been delinquent, the dollar amount past due, and/or the dollar balance of the exposures. As indicated above, the list of accounts may be linked to detailed account views. For example, a detailed view for a loan may include the original loan amount, the loan date, the next scheduled payment date, the repayment type (e.g., amortizing principal and interest), the rate type (e.g., fixed rate), the interest rate, information describing the collateral, and so on.

As described above, the database of server memory 160 may comprise cash flow data 166. Examples of cash flow data 166 include incoming cash flow 206, outgoing cash flow 208, and net cash flow 210. Incoming cash flow 206 may refer to deposits or transfers-in, investment accounts gains, or other positive cash flow. Outgoing cash flow 208 may refer to negative cash flow, such as expenses or investment account losses. In some embodiments, cash flow data 166 may be categorized. For example, incoming cash flow may be categorized into transfer-in amounts and other amounts, and outgoing cash flow 208 may be categorized into entertainment, retail, services, utilities, transfer-out amounts, and other amounts. All incoming values may be added together to determine the total incoming balance, and all outgoing values may be added together to determine the total outgoing balance. The total incoming balance and the total outgoing balance may be added to yield the net cash flow 210. In some embodiments, net cash flow 210 may be provided on a rolling basis. For example, cash flow data 166 may include monthly snapshots of net cash flow 210 for a selected time period, such as one year. Cash flow data 166 may be updated at any suitable interval, such as daily, monthly, quarterly, or annually.

FIG. 3 illustrates a flowchart for aggregating data associated with a customer. The method begins at step 302 by receiving a request for customer records. In some embodiments, the request may be initiated by a user via a website, such as a password-protected or other secure website. The website prompts the user to lookup a customer using any suitable search criteria. Examples of search criteria include name, phone number, address information, account number, social security number, or party identifier.

At step 304, the method determines a customer identifier based on the request. As an example, the method may select the social security number, the party identifier, or another criterion from the request as the customer identifier. Alternatively, the method may map one or more criterion from the request to a customer identifier, such as a party identifier assigned by the enterprise.

The method proceeds to step 306 to determine a household identifier associated with the customer identifier. Any suitable household identifier may be used, such as a prefix of the party identifier. In some embodiments, parties may be associated with the same household identifier based on an algorithm that compares data points. As an example, the algorithm may determine that customers having the same last name and the same address belong to the same household.

The cash flow records and the exposure records associated with the household may be determined at steps 308 and 310. For example, one or more databases may be queried according to the household identifier to determine the records associated with the household. At step 312, the method determines if any records associated with the household identifier remain. As an example, the method may confirm that records have been obtained from each network storage device configured to store records associated with the household identifier. As another example, the method may confirm that records have been obtained for each member of the household and for each line of business that provides products to the household. If any records remain, the method returns to step 308 to determine the records. If no records remain, the method proceeds to step 314 to aggregate the records. Aggregating the records may refer to sorting, combining, performing calculations, or otherwise preparing the data in order to generate a comprehensive household view.

Once the records have been aggregated, the method processes the data according to a risk-determination rule at step 316. An example of a risk-determination rule may be to determine whether the customer has accrued a certain number of exposure events, such as three late payments, a certain combination of exposure events, such as a late payment combined with a decrease in a line of credit, or particular cash flow events, such as a negative cash flow or a disproportionate amount of spending on entertainment.

At step 318, the method compares the calculated risk level to a pre-determined risk level. The pre-determined risk level indicates whether the risk is considered to be potentially problematic. Accordingly, if the calculated risk level is less than the pre-determined risk level, the method proceeds directly to step 322. Alternatively, if the calculated risk level is greater than or equal to the pre-determined risk level, the method communicates an indication of the risk level at step 320. Any suitable risk indication may be used. For example, data associated with the risk may be highlighted. As another example, a description of the risk may be generated, such as a text description or a numeric risk score.

The method communicates the aggregated records at step 322. As an example, the method displays the aggregated records and any risk indicators via the website that the user utilized to enter the request. The aggregated records may be displayed in any suitable format, such as the table format described with reference to FIG. 2. The method then ends.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described in detail, it should be understood that various changes, substitutions, and alterations can be made hereto without departing from the scope of the invention as defined by the appended claims.

What is claimed is:

1. A method for aggregating data associated with a customer to facilitate a business transaction, comprising:
   receiving a request to aggregate data associated with a customer, wherein the request comprises a customer identifier;
   determining, by a processor, a first identifier associated with the customer that identifies the customer, wherein determining the first identifier comprises determining a party identifier associated with the customer identifier, the party identifier identifies all accounts associated with the customer;
   determining, by the processor, a second identifier according to the party identifier that identifies individual member of a household associated with the customer;
   aggregating, by the processor, data associated with the second identifier, wherein the data associated with the second identifier includes exposure data and cash flow data of each individual member of the household; and
   communicating the aggregated data in response to the request.

2. The method of claim 1, further comprising;
   processing the aggregated data according to a risk-determination rule to determine a risk level;
   determining whether the risk level exceeds a pre-determined threshold; and
   communicating a risk indicator if the risk level exceeds the pre-determined threshold.

3. The method of claim 1, further comprising:
   determining a first set of contact information that a first line of business associates with the customer;
   determining a second set of contact information that a second line of business associates with the customer;
   aggregating the first set of contact information and the second set of contact information; and
   communicating the aggregated contact information.

4. The method of claim 1, wherein the aggregating data associated with the second identifier further comprising:
   accessing a plurality of records associated with the second identifier;
   repeating for each record of the plurality of records:
      determining a type of data contained in the each record;
      comparing the age of the each record to a maximum age for the type of data contained in the each record; and
      if the age of the each record exceeds the maximum age, excluding data of the each customer record from the aggregated data.

5. The method of claim 1, wherein aggregating data associated with the second identifier includes:
   aggregating exposure data associated with the second identifier, the exposure data indicating whether a bankruptcy, a foreclosure, a charge off, a delinquency, or a credit counseling event is associated with the second identifier; and
   aggregating cash flow data associated with the second identifier, the cash flow data indicating an amount of incoming money and an amount of out going money associated with the second identifier during a time period.

6. A non-transitory computer readable storage medium comprising logic, the logic, when executed by a processor, operable to:
   receive a request to aggregate data associated with a customer; wherein the request comprises a customer identifier;
   determine a first identifier associated with the customer that identifies the customer, wherein determining the first identifier comprises determining a party identifier associated with the customer identifier, the party identifier identifies all accounts associated with the customer;
   determine a second identifier according to the party identifier that identifies individual members of a household associated with the customer;
   aggregate data associated with the second identifier, wherein the data associated with the second identifier includes exposure data and cash flow data of each individual member of the household; and
   communicate the aggregated data in response to the request.

7. The computer readable storage medium of claim 6, further operable to;
   process the aggregated data according to a risk-determination rule to determine a risk level;
   determine whether the risk level exceeds a pre-determined threshold; and
   communicate a risk indicator if the risk level exceeds the pre-determined threshold.

8. The computer readable storage medium of claim 6, further operable to:
   determine a first set of contact information that the first business associates with the customer;
   determine a second set of contact information that the second business associates with the customer;
   aggregate the first set of contact information and the second set of contact information; and
   communicate the aggregated contact information.

9. The computer readable storage medium of claim 6, wherein the logic aggregates data associated with the second identifier by:
- accessing a plurality of records associated with the second identifier;
- repeating for each record of the plurality of records:
  - determining a type of data contained in the each record;
  - comparing the age of the each record to a maximum age for the type of data contained in the each record; and
  - if the age of the each record exceeds the maximum age, excluding data of the each customer record from the aggregated data.

10. The computer readable storage medium of claim 6, wherein the logic aggregates data associated with the second identifier by:
- aggregating exposure data associated with the second identifier, the exposure data indicating whether a bankruptcy, a foreclosure, a charge off, a delinquency, or a credit counseling event is associated with the second identifier; and
- aggregating cash flow data associated with the second identifier, the cash flow data indicating an amount of incoming money and an amount of outgoing money associated with the second identifier during a time period.

11. A system for aggregating data associated with a customer to facilitate a business transaction, comprising:
- an interface operable to:
  - receive a request to aggregate data associated with a customer; wherein the the request comprises a customer identifier; and
- one or more processors operable to:
  - determine a first identifier associated with the customer that identifies the customer, wherein determining the first identifier comprises determining a party identifier associated with the customer identifier, the party identifier identifies all accounts associated with the customer;
  - determine a second identifier according to the party identifier that identifies individual members of a household associated with the customer; and
  - aggregate data associated with the second identifier, wherein the data associated with the second identifier includes exposure data and cash flow data of each individual member of the household; and
- the interface further operable to communicate the aggregated data in response to the request.

12. The system of claim 11, the one or more processors further operable to:
- process the aggregated data according to a risk-determination rule to determine a risk level; and
- determine whether the risk level exceeds a pre-determined threshold; and
- the interface further operable to communicate a risk indicator if the risk level exceeds the pre-determined threshold.

13. The system of claim 11, the one or more processors further operable to:
- determine a first set of contact information that the first business associates with the customer;
- determine a second set of contact information that the second business associates with the customer; and
- aggregate the first set of contact information and the second set of contact information; and
- the interface further operable to communicate the aggregated contact information.

14. The system of claim 11, the one or more processors operable to aggregate the data associated with the second identifier by:
- accessing a plurality of records associated with the second identifier;
- repeating for each record of the plurality of records:
  - determining a type of data contained in the each record;
  - comparing the age of the each record to a maximum age for the type of data contained in the each record; and
  - if the age of the each record exceeds the maximum age, excluding data of the each customer record from the aggregated data.

15. The system of claim 11, the one or more processors operable to aggregate the data associated with the second identifier by:
- aggregating exposure data associated with the second identifier, the exposure data indicating whether a bankruptcy, a foreclosure, a charge off, a delinquency, or a credit counseling event is associated with the second identifier; and
- aggregating cash flow data associated with the second identifier, the cash flow data indicating an amount of incoming money and an amount of outgoing money associated with the second identifier during a time period.

* * * * *